United States Patent [19]

Saens et al.

[11] Patent Number: 4,926,149

[45] Date of Patent: May 15, 1990

[54] PROTECTED ELECTRIC SWITCHING APPARATUS AND A DEVICE FOR FIXING SAME

[75] Inventors: Michel S. Saens, Poses; Bruno Jacquet, Saint Germain En Laye; Philippe Marie, Rouen; Frédéric Noirot, Asnieres; Francois Tellier, Houilles, all of France

[73] Assignee: La Telemecanique Electrique, France

[21] Appl. No.: 292,170

[22] Filed: Dec. 30, 1988

[30] Foreign Application Priority Data

Dec. 30, 1987 [FR] France .................................. 87 18346

[51] Int. Cl.$^5$ ........................................... H01H 51/08
[52] U.S. Cl. ....................................... 335/132; 439/716
[58] Field of Search ................ 335/132; 361/419, 420; 439/716, 717

[56] References Cited

U.S. PATENT DOCUMENTS 4,018,413  4/1977  Bauer ...................................... 439/716
4,698,726 10/1987  Ootsuka et al. ....................... 335/132

Primary Examiner—H. Broome
Attorney, Agent, or Firm—William A. Drucker

[57] ABSTRACT

A protected electric switching apparatus is provided and its fixing device, comprising a contactor with a latch for engaging a profiled rail and with which a removable thermal relay is associated by means of conducting pins. A channel is formed between two opposite walls so as to allow a screwdriver to have access to an eye of this latch.

2 Claims, 1 Drawing Sheet

PROTECTED ELECTRIC SWITCHING APPARATUS AND A DEVICE FOR FIXING SAME

BACKGROUND OF THE INVENTION

The invention relates to an electric apparatus with thermal protection comprising:

on the one hand, a contactor with a wall which extends between a fixing base having a latch adapted to cooperate with a profiled rail and to be unlocked by a tool, and which has, in the vicinity of its front face, power terminals and at least one signaling terminal, and on the other hand, a thermal relay with an association face which has conducting pins adapted to penetrate into these terminals for establishing an electric connection and for fixing the relay by placing this face in the immediate vicinity of this wall.

In known apparatus, whose construction complies with that mentioned above, and which are very widely used for supplying motors, it is necessary to dissociate the thermal relay from the contactor in order to have access to the fixing latch and change this apparatus; this requirement is due to the fact that the locking hook is generally placed in a plane of symmetry of the contactor which itself passes through a region of the thermal relay containing the conducting pins connecting it to the terminals of this contactor.

Changing a single contactor is in fact not a very frequent operation, for the number of operating cycles which the contacts of power switches can carry out is chosen to be appreciably greater than that which will be effectively used; however, the deterioration of an electromagnet coil or the need to re-organize equipment inside a control cabinet, form possibilities which the constructor must take into account in order to facilitate the work of the maintenance staff.

SUMMARY OF THE INVENTION

The present invention consequently proposes providing the user with a protected switching apparatus whose general construction complies with that mentioned above, and in which measures are taken so that a response is made to the needs felt.

According to the invention, this object is attained because this association face has a recess or passage extending opposite the signaling terminal, perpendicularly to the fixing plane RR' of the profiled rail between a notch for operating the latch and a front face of the thermal relay adjacent the front face of the contactor.

BRIEF DESCRIPTION OF THE DRAWINGS

The invention will be better understood from reading the following description with reference to the two accompanying figures which show.

DESCRIPTION OF THE PREFERRED EMBODIMENT

A protected switching apparatus 1 results from the association of a contactor 2 whose function is to establish the passage of multiphase currents to a load such as a motor, and a thermal relay 3 whose function is to react to low but extended current overloads.

Contactor 2 is fixed to a profiled rail 4 which is fixed to a wall or plate such as 5.

Figure 1:
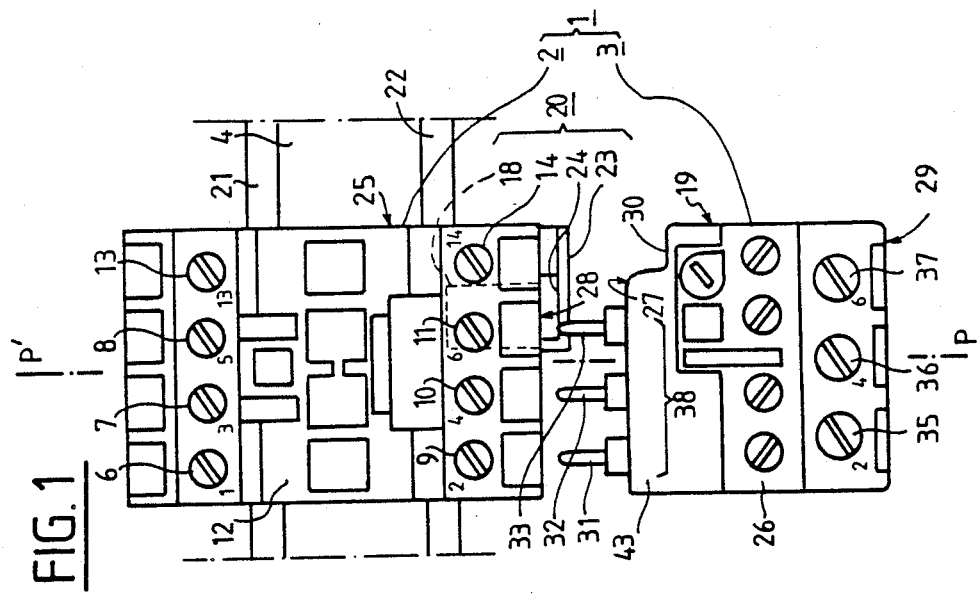
FIG. 1, an elevational view of a protected switching apparatus, in which the contactor and the relay are dissociated.

The contactor has a first set of power switches, whose input terminals and output terminals are shown by the references 6, 7, 8 respectively 9, !0, 11: a second set of signaling switches, possibly only comprising one as can be seen in FIG. 1, has an input terminal 13 and an output terminal 14.

Figure 2:
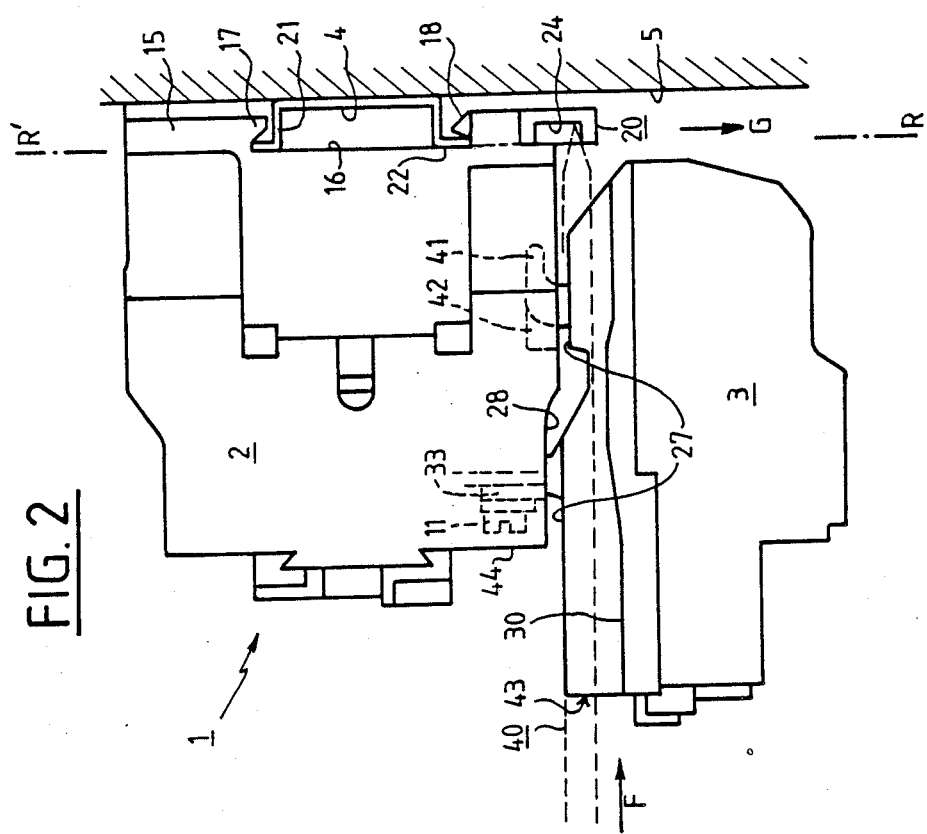
FIG. 2, a left hand view of the apparatus of FIG. 1, in which the contactor and the relay are associated.

The case 12 of the contactor has, under its base 15, a recess 16 which is limited by a fixed edge 17 and which receives, on the opposite side, the end 18 of a resiliently mobile hook or latch 20, see FIG. 2. This end and this edge are engaged on the flanges 21, 22 of the profiled rail 4: as can be seen in FIG. 1. this locking hook 20 has a projecting lug 23 and an operating eye or notch 24 which are laterally offset with respect to a plane of symmetry PP' of the contactor.

This offset may bring the lug and/or the notch up to the level of the sidewall 25 of case 12, but does not necessarily mean that the end 18 of latch 20 is itself substantially offset with respect to the plane PP'.

However, this lateral offset brings the operating notch 24 in the vicinity of wall 25 near which are disposed the terminals 13, 14 of the auxiliary switch.

The casing 26 of the thermal relay 3 has, on a face 27 placed opposite a face 28 of the contactor, three projecting conducting pins 31, 32, 33 whose spacing apart and length are chosen so that they may penetrate into terminals 9, 10, 11 and be clamped therein by the corresponding screws.

These pins form the inputs of current circuits comprising bi-metal strips and ending in output terminals 35, 36, 37 on an opposite face 29.

It will be noted that the numbers disposed in the immediate vicinity of the screws of these terminals have no relation with the references of the described elements; they correspond to standardized marking which has been chosen for identifying their functions. When relay 3 is associated with contactor 2, the plane PP' forms substantially a plane of symmetry common to these two elements.

In a side region of face 27 is placed a recess or passage 30 which is situated opposite the auxiliary switch terminal 14 and which does not interfere with the region 38 containing pins 31, 32, 33. Preferably, this passage will open into a side face 19 of the thermal relay extending the lateral face 25 of the contactor.

When the contactor and the thermal relay are associated, see FIG. 2, this passage, which extends substantially perpendicularly to the fixing plane RR' of the profiled rail, is limited by the immediate proximity of faces 27, 28 and makes possible the access of a tool such as a screwdriver 40 between the front face 43 of relay 3 adjacent the front face 44 of the contactor and the operating notch 24, so as to communicate thereto a movement in direction G for freeing the end 18 of latch 20.

As can be seen in FIG. 2, the mechanical fastening of the thermal relay, which is partly provided by the pins nipped in the terminals, is completed by the penetration of a hook 41 projecting from face 27 into a notch 42 opening into face 28.

What is claimed is:

1. An electric apparatus with thermal protection comprising:
   (i) a contactor having a fixing base provided with means for fixing said apparatus on a profiled rail, a front face which extends opposite said base, and lateral faces including a first associated face which extends between said base and said front face, said first association face comprising, in the vicinity of the front face a row of terminals including power terminals and at least one signaling terminal and said fixing means comprising a latch provided with a control means which projects from said first association face in a region thereof located under said signaling terminal near said base, so as to be accessible by an elongated tool;

(ii) a thermal relay comprising a second association face provided with conducting pins arranged so as to be engaged and fixed in the said power terminal when said thermal relay is in an assembled position, with the second association face facing the first association face and in a close vicinity thereof, said conducting pins thus serving to assume both an electric connection and a mechanical fixing between said contactor and said thermal relay, wherein said second association face is provided with a recess forming a passage extending perpendicularly to said base along an axis passing in front of said signaling terminal and through said control means.

2. The switching apparatus as claimed in claim 1, in which the signaling terminal is adjacent a sidewall of the contactor, wherein said recess ends at a lateral face of the thermal relay and extends towards a notch of a latch which is laterally offset with respect to a median plane common to the relay and to the contactor.

* * * * *

UNITED STATES PATENT AND TRADEMARK OFFICE
CERTIFICATE OF CORRECTION

PATENT NO. : 4,926,149
DATED      : May 15, 1990
INVENTOR(S) : Michel Saint Saens et al.

It is certified that error appears in the above-identified patent and that said Letters Patent is hereby corrected as shown below:

On the title page inventors should read

(75)   Inventors: Michel Saint Saens, Poses; Bruno Jacquet, Saint Germain En Laye; Philippe Marie, Rouen, Frédéric Noirot, Asnieres; Francois Tellier, Houilles, all of France On the title page item (19) should read
--Saint Saens et al--

Signed and Sealed this

Seventeenth Day of December, 1991

Attest:

HARRY F. MANBECK, JR.

*Attesting Officer*        *Commissioner of Patents and Trademarks*